United States Patent [19]
Eckstein et al.

[11] Patent Number: 6,039,142
[45] Date of Patent: Mar. 21, 2000

[54] OPERATING ELEMENT ARRANGEMENT WITH ARTICULATED ARCUATE OPERATING ELEMENT FOR CONTROLLING MOTOR VEHICLE LONGITUDINAL AND TRANSVERSE MOVEMENT

[75] Inventors: Lutz Eckstein, Stuttgart; Werner Reichelt, Esslingen, both of Germany

[73] Assignee: DaimlerChrysler AG, Germany

[21] Appl. No.: 08/883,502

[22] Filed: Jun. 26, 1997

[30] Foreign Application Priority Data

Jun. 26, 1996 [DE] Germany ............................ 196 25 498

[51] Int. Cl.[7] ................................................ B60K 26/00
[52] U.S. Cl. ............................................................ 180/333
[58] Field of Search ........................ 180/333; 74/471 XY; 200/6 A; 273/148 B; 338/128; 244/234

[56] References Cited

U.S. PATENT DOCUMENTS

| | | |
|---|---|---|
| 3,022,850 | 2/1962 | Bidwell et al. . |
| 3,350,956 | 11/1967 | Monge ................ 74/471 XY |
| 3,651,709 | 3/1972 | Booty et al. .............. 74/483 R |
| 3,726,497 | 4/1973 | Gannett et al. ............. 200/6 A |
| 3,814,199 | 6/1974 | Jones ........................ 180/6.5 |
| 3,850,258 | 11/1974 | Bauer ........................ 180/333 |
| 4,140,200 | 2/1979 | Tucek ........................ 180/333 |
| 4,186,935 | 2/1980 | Rudwick ................... 280/269 |
| 4,478,305 | 10/1984 | Klaassen ................... 180/236 |
| 4,718,869 | 1/1988 | Fisher ........................... 440/1 |
| 5,042,314 | 8/1991 | Rytter et al. ................. 74/335 |
| 5,086,870 | 2/1992 | Bolduc ...................... 180/333 |
| 5,261,291 | 11/1993 | Schoch et al. ............. 74/484 R |
| 5,466,996 | 11/1995 | Gai et al. ..................... 318/16 |
| 5,644,903 | 7/1997 | Davis, Jr. .................... 56/10.8 |

FOREIGN PATENT DOCUMENTS

| | | |
|---|---|---|
| 195 45 717 | of 0000 | Germany . |
| 14 30 126 | 10/1968 | Germany . |
| 1220022 | of 0000 | United Kingdom . |

OTHER PUBLICATIONS

13th International Technical Conference on Experimental Safety Vehicles, P. Bränneby et al., Nov. 1991, pp. 224–230 and cover sheet.

Arbeitsplatz Fahrer—Eine ergonomische Studie, H. Bubb, Mar. 1985, 11 pages.

*Primary Examiner*—Kevin Hurley
*Assistant Examiner*—Andrew J. Fischer
*Attorney, Agent, or Firm*—Evenson, McKeown, Edwards & Lenahan, P.L.L.C.

[57] ABSTRACT

The operating element is arcuate and is articulated in a lower driver's seat region pivotably about a transverse control axis located on the longitudinal side of the vehicle for controlling the transverse movement of the vehicle. The element is also movable in the longitudinal direction of the vehicle for controlling the vehicle longitudinal movement. The element extends upwards from the lower seat region, on at least one side of the driver's seat, laterally past the adjacent seat cushion and terminates in a end handle. This arrangement provides an ergonomically favorable and reliable operating element so as to dispense with a steering wheel, a brake and accelerator pedal assembly.

6 Claims, 3 Drawing Sheets

ND SUMMARY OF THE
OPERATING ELEMENT ARRANGEMENT WITH ARTICULATED ARCUATE OPERATING ELEMENT FOR CONTROLLING MOTOR VEHICLE LONGITUDINAL AND TRANSVERSE MOVEMENT

BACKGROUND AND SUMMARY OF THE INVENTION

The present invention relates to an operating element arrangement for controlling both the longitudinal movement and the transverse movement of a motor vehicle.

In a conventional automobile, the steering wheel controls the transverse movement and the accelerator and brake pedals control the longitudinal movement. P. Branneby et al., "Improved Active and Passive Safety by Using Active Lateral Dynamic Control and an Unconventional Steering Unit", 13th International Technical Conference on Experimental Safety Vehicles, Nov. 4th to 7th 1991, Proceedings Vol. 1, page 224, proposes an alternative to the conventional steering wheel in the form of an operating lever which is arranged, for example, on the vehicle transmission tunnel.

Furthermore, a common operating element for controlling the longitudinal and transverse dynamics of a motor vehicle is known, and, in an associative relationship of the actuating functions, preferably the longitudinal movement is controlled by actuating the operating element in the vehicle longitudinal direction and the transverse movement is controlled by actuating the latter in the transverse direction, in particular as a rotational movement corresponding to the conventional steering wheel. such an operating element is disclosed in U.S. Pat. No. 3,022,850 in the form of a control stick which is mounted on a frame so as to pivotable about a horizontal transverse axis, the frame being itself rotatable about a horizontal longitudinal axis.

A further operating element of the above-mentioned type is mentioned in H. Bubb, Arbeitsplatz Fahrer—eine ergonomische Studie, [Driver's Workstation—An ergonomic study], Automobil-Industrie [Automobile Industry] 3/85, page 265. The arrangement contains two mechanically interconnected plate-like handles which are located closely next to one another and which are attached to the end of a bar guided movably on the vehicle center console. The longitudinal dynamics of the vehicle are controlled by displacing the bar in the vehicle longitudinal direction, while the transverse dynamics are influenced by rotating the two plate-like handles in the vehicle transverse plane.

We are aware of an operating element arrangement for controlling motor vehicle longitudinal and transverse movement, wherein two operating elements can be actuated independently of one another. Each of the elements is intended for controlling the longitudinal and transverse movement and is preferably designed as a manually actuatable control stick. Command collisions are prevented by electronic coupling of the two operating elements, for example by the additive superposition of the control command signals, by the manual passive switching of one operating element in each case or by assigning different priorities for the two operating elements.

An object of the present invention is to provide an operating element arrangement for controlling the longitudinal and transverse movement of a motor vehicle with high operating comfort and high functional reliability.

The invention has achieved this object by providing an operating element arrangement containing an arcuate operating element which is articulated in a lower driver's seat region pivotably about a transverse control axis perpendicular to the transverse direction of the vehicle for controlling the vehicle transverse movement, and movably in the vehicle longitudinal direction for controlling the vehicle longitudinal movement. Starting from this region of articulation, the element extends upwardly, at least on one side of the driver's seat, laterally past the seat cushion of that seat, where the operating element terminates in an end handle.

Because the movement of the operating element for influencing the transverse dynamics of the vehicle takes place as a pivoting movement about a transverse control axis essentially perpendicular to the vehicle transverse direction, this movement resembles that of the conventional steering wheel, thus simplifying relearning by the driver. Moreover, in conjunction with the arcuate configuration of the operating element, acceleration forces acting on the operating element are prevented from leading to falsifications of the steering-angle desired-value input intended by the driver. The longitudinal movability of the operating element for the control of longitudinal movement has the advantage of following the intuitive driving sensation.

On one hand, the operating element arrangement of the present invention provides, the known advantages of a common operating element for controlling of longitudinal and transverse movement in comparison with conventional arrangements with a steering wheel for the control of transverse movement and with an accelerator and brake pedal assembly, uncoupled therefrom, for the control of longitudinal movement. These advantages include higher steering regulation speeds, reduced risks of accidents caused by the steering wheel and pedal assembly, no need to change pedals during the control of longitudinal movement, a large amount of free space for placing the instruments as a result of the omission of the steering wheel, a comfortable body posture with a free choice of foot position and with a near-body position of the hand on the handle and the possibility of shortening the vehicle by the amount of the space hitherto required for the steering wheel and the pedal assembly, while having the same available space and improved access for climbing into the vehicle.

On the other hand, the ergonomics are improved in comparison with arrangements with a common operating element for the control of longitudinal and transverse movement in the form of a control stick accommodated on the transmission tunnel or in the driver's door. That is, the operating element of the present invention extends with its end handle laterally past the driver's seat cushion element upwardly into the region of the upper body of the driver who can consequently operate the operating element with his or her arm in a very comfortable, essentially horizontal position.

In another embodiment of an operating element arrangement, the operating element extends in a U-shaped manner around the driver's seat cushion element and terminates only appreciably above the latter in two handles which are located preferably approximately at seat backrest midheight to allow the operating element to be operated by the driver on both sides. In this arrangement, therefore, the two handles are mechanically coupled rigidly to one another, so that the driver can drive the vehicle with only one hand or only the other or else with both hands. Electronic coupling of the control commands initiated via the two handles, for the purpose of avoiding command collisions, may therefore be dispensed with. Moreover, it is necessary only to deflect or subject the single operating element to force.

In contrast to two electrically coupled operating elements actuated independently of one another, in the present invention there is not the problem where, if the functioning of one of the two handles fails, the driver has to recognize which of the two is defective. From a safety point of view, the operating element mechanism advantageously does not have to be accommodated in the driver's door. Even with this operating element capable of being actuated on both sides, it is placed in the lower region of the driver's seat.

In another form of operating element arrangement, an operating element is actuated by one hand and extends from one side of the driver's seat towards the longitudinal center region of the seat. An end handle can be grasped there in the center region comfortably by the driver. To make it easier to climb in and out of the vehicle when the vehicle is parked, the operating element can be moved into an end, seat clearance position facing away from the longitudinal center of the seat.

In yet another form of the operating element arrangement, the operating element is articulated on the driver's seat subassembly and can consequently, together therewith, be installed in and removed from the vehicle. This approach allows substantial preassembly, and thereby simplifies repair and maintenance work. Articulation takes place so that the driver's seat remains longitudinally displaceable relative to the operating element and thus the system can be adapted to different size drivers.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
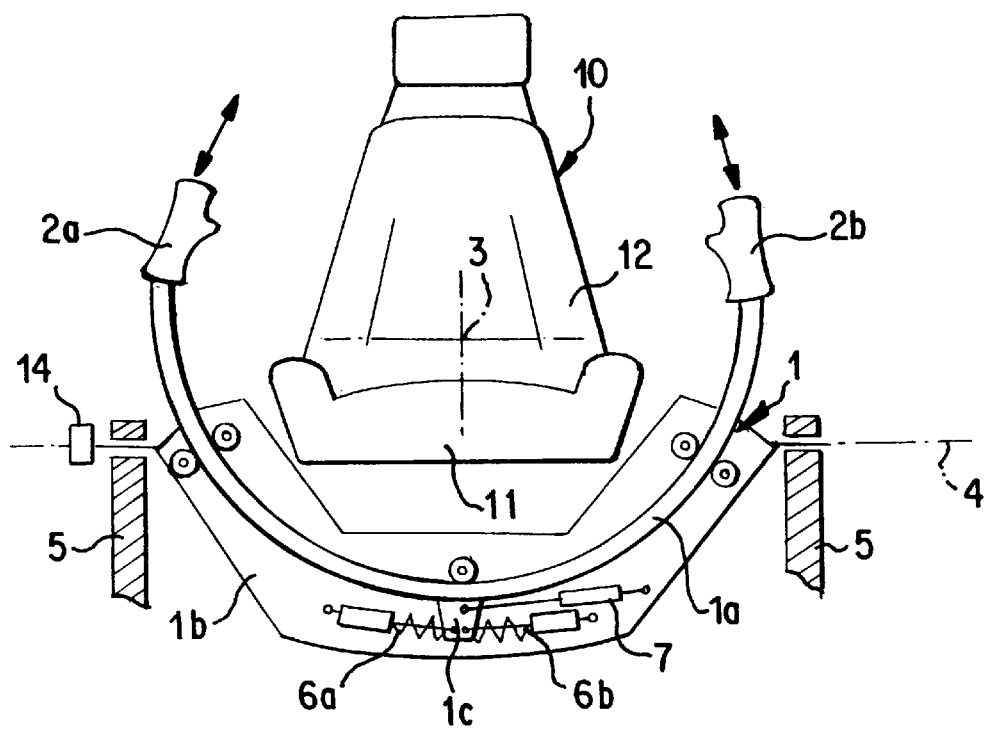
FIG. 1 is a schematic front view of a driver's seat region of a motor vehicle, with an operating element arrangement having an arcuate passive operating element, capable of being operated on both sides, for the control of longitudinal and transverse movement in accordance with the present invention.

The operating element arrangement for controlling the longitudinal and transverse movement of a motor vehicle shown in FIG. 1 is assigned to a driver's seat 10 and contains an approximately U-shaped operating element designated generally by numeral 1 in the form of a circular segment operating element rod 1a which extends in the vehicle transverse direction under the seat cushion element 11. The element 1 is drawn up symmetrically on both sides of the cushion 11 and terminates approximately at mid-height of the driver's seat backrest 12 in respective handles 2a, 2b.

The circular segment rod 1a is guided movably along its extent in an operating element shank 1b arranged in the lower driver's seat region. This movement effectively corresponds to a rotational movement of tie rod 1a together with the end handles 2a, 2b about a rotation axis 3 perpendicular to the vehicle transverse direction. To secure the illustrated rest position of the operating element rod 1a with respect to this rotational movement about the transverse control axis 3 lying in the longitudinal center of the seat in the lower backrest region of the driver's seat 10, the underside of the operating element rod 1 is provided with a boss 1c which is coupled on each of the two transverse sides to a spring/damper element 6a, 6b fixed to the inside of the shank 1b.

Moreover, coupled to the boss 1c is a linear potentiometer 7 which is fixed to the inside of the shank 1b for recording the instantaneous rotation angle of the operating element rod 1a relative to the illustrated rest position and feeding that information to an known type of evaluation unit.

Figure 2:
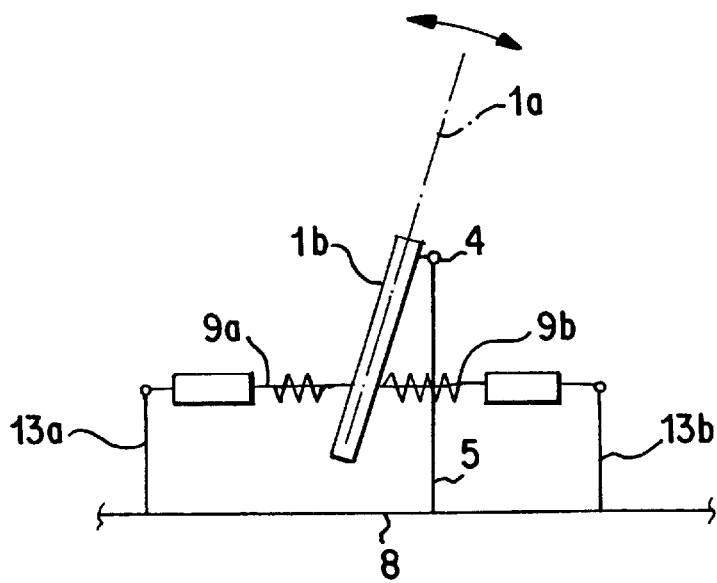
FIG. 2 is a schematic side view of the operating element arrangement for controlling longitudinal transverse movement of FIG. 1.

The shank 1b, the operating element rod 1a, and the end handles 2a, 2b, are together articulated pivotably about a horizontal transverse axis 4 on a suspension 5 which extends upwards from a bottom element 8 of the driver's seat subassembly as seen in FIG. 2. Two further spring/damper elements 9a, 9b secure the operating element 1 in its rest position, which is inclined somewhat relative to the vertical, with respect to this pivoting movement, in that the elements 9a, 9b engage on opposite outer faces of the shank 1b and, are supported on post elements 13a, 13a which extend upwards from the bottom element 8 of the driver's seat subassembly.

The deflection of the operating element 1 out of the rest position as a result of this pivoting movement is recorded via a rotary potentiometer 14 shown in FIG. 1, and is transmitted to the evaluation unit. An advantage of integrating the operating element arrangement 1 into the vehicle seat subassembly is that the operating element arrangement can be preassembled on the driver's seat subassembly and, together therewith, installed in the vehicle and removed from the vehicle. Thus manufacturing, repair and maintenance work on the operating element arrangement are greatly simplified. Alternatively, the operating element arrangement to be articulated on the vehicle body in the region below the seat cushion of the driver's seat without departing from the principles of the present invention.

Figure 3:
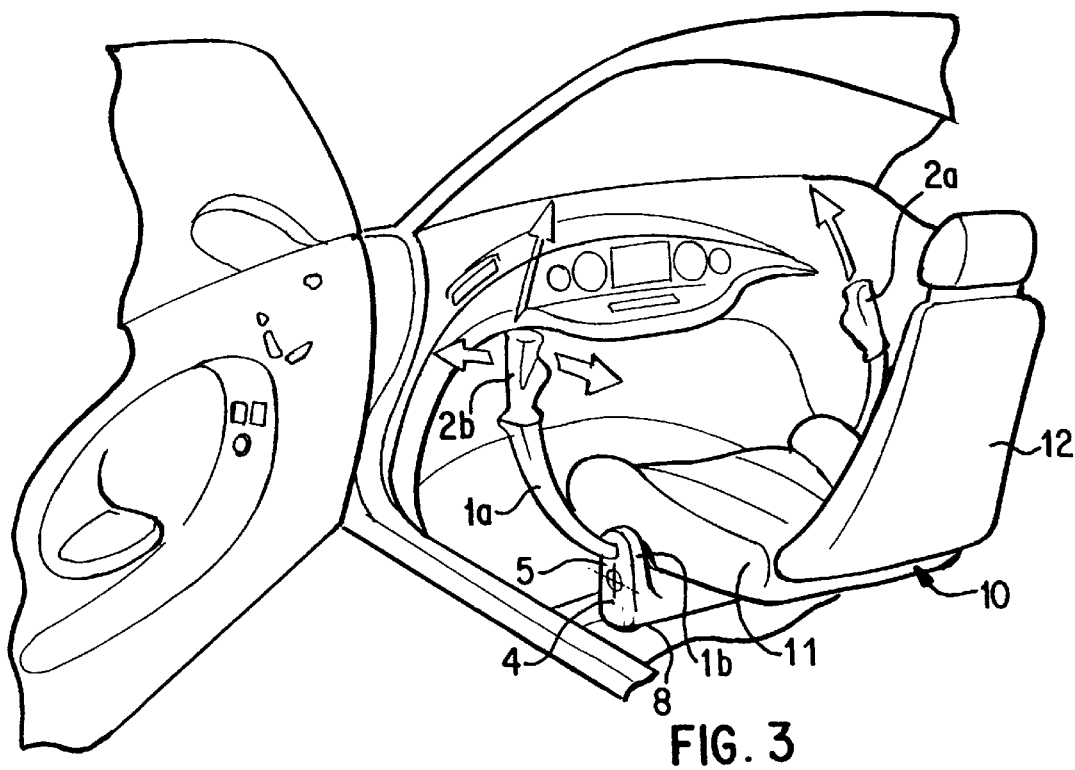
FIG. 3 is a schematic perspective view into a vehicle interior together with the driver's seat region according to FIG. 1.

As seen most clearly in FIG. 3, the operating element arrangement 1 enables the driver to drive the vehicle in a highly ergonomic manner, while dispensing with the conventional steering wheel and the conventional brake and accelerator pedal assembly. For this purpose, the driver grasps the two handles 2a, 2b, which are comfortably located laterally at arm height. To change the steering angle, via the handles 2a, 2b, the driver executes a rotational movement on the operating element rod 1a about the transverse control axis 3, this being, in a similar way, a control movement familiar to her from the conventional steering wheel. Depending on the desired direction of the steering-angle change, she rotates the operating element 1 clockwise or counterclockwise as shown by the broad arrows. The resulting angular deflection is recorded by the linear potentiometer 7, and the evaluation unit then selects a corresponding steering angle.

When the driver wants to accelerate the vehicle positively, that is to say increase vehicle speed, she presses the operating element rod 1 forwards via the handles 2a, 2b, to obtain a corresponding tilting movement of the operating element 1 about the transverse axis 4. The associated rotary-angle deflection is recorded by the rotary potentiometer 14, and the evaluation unit then activates the vehicle motor in order to achieve the desired positive longitudinal acceleration of the vehicle.

When the vehicle is to be accelerated negatively, i.e. decelerated, the driver pulls the operating element 1 towards herself (backwards) by way of the handles 2a, 2b. Once again, the corresponding tilting-angle deflection is recorded by the rotary potentiometer 14 and transmitted to the evaluation unit which then initiates a corresponding braking operation.

Because the two handles 2a, 2b are mechanically coupled rigidly via the operating element rod 1a of the operating element 1, the risk of command collisions due to the different actuation of both handles is ruled out. Thereby, no corresponding electronic counter measures have to be provided. The vehicle may be driven, by the operating element 1 configured in this way, both in its longitudinal dynamics and in its transverse dynamics, either only with one hand or only with the other or else with both hands. Due to the operating element rod 1a being configured in the form of a circle segment and being guided in the shank 1b, resulting transverse acceleration forces cannot lead to the automatic adjustment of the operating element 1 and consequently to the falsification of the intended steering-angle desired-value input. Further operating functionalities, such as, for example, the activation of direction indicator lights, horn, headlamp flasher, screen wiper, etc., can, if required, be integrated into the operating element 1, in particular into one or both handles 2a, 2b.

The operating element arrangement shown in FIGS. 1 to 3 for controlling longitudinal and transverse movement is a so-called passive system. That is, the controlled amount of movement of the vehicle is set as a function of the associated deflection of the operating element out of a spring-centered and, if appropriate, damped rest position. In contrast thereto, so-called active or isometric systems are also possible. In the isometric system, the operating element remains fixed, and the desired-value input for the amount of vehicle movement to be set takes place as a function of the force exerted on the operating element.

In the active system, the amount of vehicle movement to be controlled is likewise set as a function of the force exerted on the operating element, but, at the same time, the operating element is deflected according to the respectively instantaneous value of the amount of vehicle movement to be set in order to give the driver intuitive feedback. Alternatively, the amount of movement of the vehicle is set as a function of the deflection of the operating element, and a reaction force dependent on the instantaneous value of the amount of vehicle movement is exerted simultaneously as feedback information. In addition, combinations of these three functional principles of passive, active and isometric are possible for converting the actuation of the operating element into a corresponding setting of the activated amount of vehicle movement.

Figure 4:
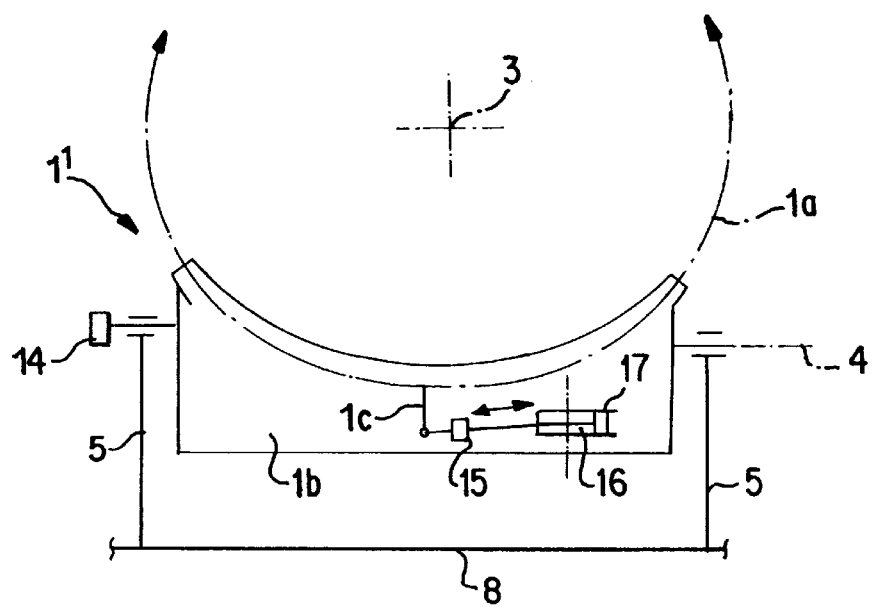
FIG. 4 is a schematic front view of an operating element arrangement for controlling longitudinal and transverse movement similar to that of FIG. 1, but with an active operating element.
Figure 5:
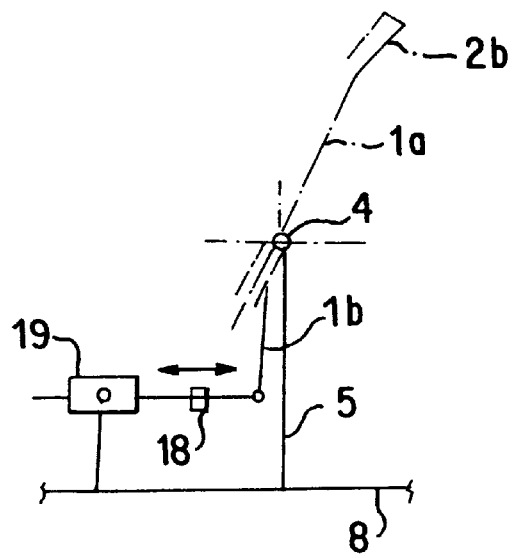
FIG. 5 is a schematic side view of the operating element arrangement of FIG. 4.

FIGS. 4 and 5 show an active system, wherein functionally identical elements to those in FIGS. 1 to 3 are provided with the same reference symbols and require no futher description. In particular, the system configuration is one with force input and path feedback. For this purpose, a load cell 15 is coupled to the boss 1c located at the underside of the operating element rod 1a. A linear servomotor 16 with a coupled rotary potentiometer 17 is connected to the load cell 15 in order to carry out transverse movement control. For this purpose, the torque about the transverse control axis 3, exerted by the driver on the thus modified operating element 1 via its handles, is recorded by the load cell 15 and is transmitted to an associated evaluation unit which sets a corresponding steering angle as a function of the sensed force. Retroactively, the linear servomotor 16, having a spindle drive whose position is sensed by the rotary potentiometer 17, is activated as a function of the respectively instantaneous steering-angle value and thereby rotates the operating element rod 1a, together with its end handles, correspondingly about the transverse control axis 3. The rotary position set via the electric motor 16 with respect to the transverse control axis 3 is consequently a measure, intuitively detectable by the driver directly via the handles, of the instantaneous vehicle steering angle.

FIG. 5 shows a similar measures for the controlling longitudinal movement. A load cell 18 is coupled to the operating element shank 1b guiding the operating element rod 1a and senses the longitudinal forces exerted on the shank 1b. The load cell 18 transmits this information to the associated evaluation unit which, as a function of the sensed force value, initiates a corresponding positive or negative vehicle acceleration, that is to say a corresponding increase or decrease in the vehicle longitudinal speed. An electric linear servomotor 19 is coupled, in turn, to the shank 1b via the load cell 18 and has a spindle drive which tilts the shank 1b and consequently the operating element rod 1a together with its handles about the horizontal transverse axis 4 as a function of the respectively instantaneous value of the longitudinal acceleration or longitudinal deceleration or, alternatively, of the longitudinal speed. Thus, the driver is given relevant intuitive feedback.

Altogether, the several operating element arrangements according to FIGS. 1 to 5 enable the driver to adopt a highly relaxed ergonomic body posture, with reliable mechanical coupling of the actuations of the operating element which are exerted by the driver's right hand or left hand.

Figure 6:
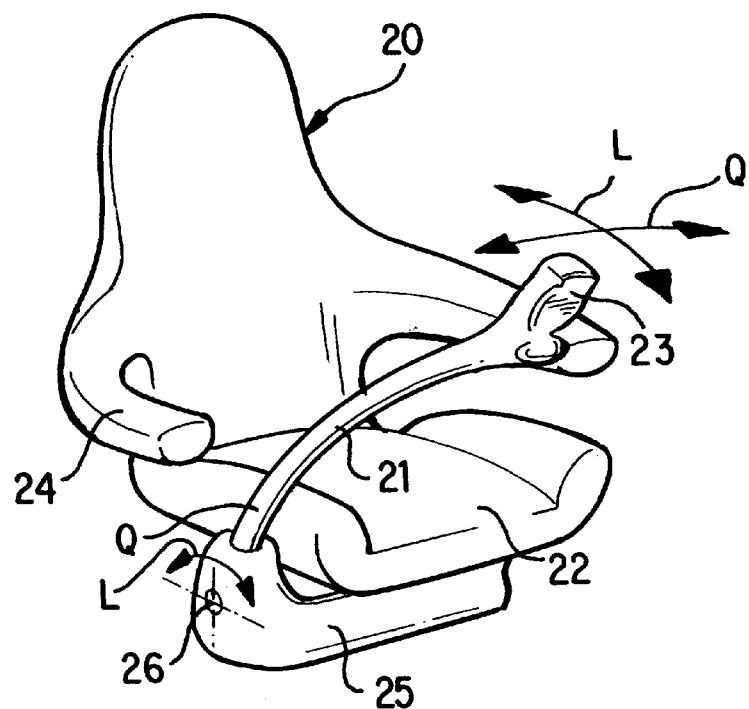
FIG. 6 is a schematic perspective view of a driver's seat region with an operating element, drawn up on one side, for controlling longitudinal and transverse movement.

FIG. 6 further shows an operating element arrangement for controlling the vehicle longitudinal and transverse movement assigned to a motor vehicle driver's seat 20. This arrangement has an operating element rod 21 which extends asymmetrically on only one of the two seat side regions, from a lower driver's seat region below the seat cushion 22, laterally upwards curvedly around the seat cushion 22 and towards the longitudinal center of the seat, where it terminates in a handle 23 which is located at a level just above seat armrests 24. Consequently, the rod 21 can be grasped comfortably and in an ergonomically favorable way by the driver's right hand. With the exception of its asymmetric design, the articulation and functioning of this operating element for the control of longitudinal and transverse movement correspond essentially to the those described above. In particular, the operating element rod 21 is guided in a shank 25 extending transversely below the seat cushion 22 so as to be transversely movable for controlling the vehicle transverse movement, as indicated by the corresponding double arrow Q. For controlling the longitudinal movement of the vehicle, the rod 21 can be tilted, together with the shank 25, about a horizontal transverse axis 26, as indicated by the associated double arrow L. The driver can thus drive the vehicle by operating this operating element arrangement with one hand on the handle 23.

The asymmetric design of the operating element arrangement, having the operating rod 21 extending into the driver's grip region from one side only, enables the driver to climb into and out of the vehicle comfortably, without being impeded, because the operating element rod 21 extends out of the shank 25 on the seat side facing the longitudinal center of the vehicle, so that the seat side region located on the door side remains freely accessible. Furthermore, for unimpeded climbing into and out of the vehicle, the operating element rod 21, together with its end handle 23, can be pushed into its end or seat clearance position located on the right when the engine is shutoff, i.e. in the direction of the vehicle longitudinal center, and remain there.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle having an operating arrangement for controlling longitudinal and transverse movement of the motor vehicle, the operating arrangement comprising a single arcuate operating element articulateably arranged in a lower region of a driver's seat pivotally about a transverse control axis perpendicular to a vehicle transverse direction and configured to control the transverse movement, and configured to be moveable in a longitudinal vehicle direction to control the longitudinal longitudinal movement, wherein the element extends from the seat region upwards, on at least one side of the driver's seat, laterally past a seat cushion of the driver's seat and terminates in an end handle.

2. The motor vehicle having an operating element arrangement according to claim 1, wherein the operating is U-shaped and extends upwards on both sides of the driver's seat so as to have each upwardly extending portion terminating in the end handle.

3. The motor vehicle having an operating arrangement according to claim 1, wherein the operating element extends upwardly from a floor region of the motor vehicle curving towards a longitudinal center of the driver's seat on only one side thereof such that, in a state of the vehicle engine being switched off, the operating element is operatively arranged to be moved into an end position facing away from the longitudinal center of the seat.

4. The motor vehicle having an operating element arrangement according to claim 1, wherein the operating element is articulated on a driver's seat subassembly in which the driver's seat is longitudinally displaceable relative to the operating element.

5. The motor vehicle having an operating arrangement according to claim 4, wherein the operating element has a U-shaped configuration, the legs of which extend upward on both sides of the driver's seat so as to have each upwardly extending portion terminating in a handle.

6. The motor vehicle operating according to claim 4, wherein the operating element extends upwards and towards a longitudinal center of the driver's seat on only one side thereof such that, in a state of the vehicle engine being switched off, the operating element is operatively arranged to be moved into an end position facing away from the longitudinal center of the seat.

* * * * *